United States Patent
Guo et al.

(10) Patent No.: US 12,498,878 B2
(45) Date of Patent: Dec. 16, 2025

(54) DATA SWAPPING METHOD AND APPARATUS

(71) Applicant: HUAWEI TECHNOLOGIES CO., LTD., Guangdong (CN)

(72) Inventors: Fan Guo, Shenzhen (CN); Xiongfeng Wang, Hangzhou (CN); Yongqiang Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 18/541,176

(22) Filed: Dec. 15, 2023

(65) Prior Publication Data

US 2024/0143220 A1     May 2, 2024

Related U.S. Application Data

(63) Continuation of application No. PCT/CN2022/097694, filed on Jun. 8, 2022.

(30) Foreign Application Priority Data

Jun. 16, 2021 (CN) .......................... 202110669020.8

(51) Int. Cl.
*G06F 3/06*     (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
See application file for complete search history.

(56) References Cited

U.S. PATENT DOCUMENTS

| | | | |
|---|---|---|---|
| 2004/0221125 A1 | 11/2004 | Ananthanarayanan et al. | |
| 2016/0350236 A1* | 12/2016 | Tsirkin | G06F 12/1081 |
| 2017/0090821 A1 | 3/2017 | Woodward et al. | |
| 2022/0398199 A1* | 12/2022 | Calciu | G06F 9/5016 |

FOREIGN PATENT DOCUMENTS

| | | |
|---|---|---|
| CN | 108989432 A | 12/2018 |
| CN | 111143072 A | 5/2020 |
| CN | 111522512 A | 8/2020 |
| CN | 112214168 A | 1/2021 |

OTHER PUBLICATIONS

Li Feng et al: "Userland Co-Pager:"Boosting Data-Intensive Applications with Non-volatile Memory, Userspace paging, XP058653345, Mar. 8, 2019 (Mar. 8, 2019), total 6 pages.
Extended European Search Report issued in EP22824103.0, dated Jul. 4, 2024, 13 pages.

* cited by examiner

*Primary Examiner* — Jane W Benner

(57) ABSTRACT

A data swapping method is disclosed. The data swapping method is applied to a host. An operating system and a target application are installed on the host. The operating system includes user space. A user interface of the target application is disposed in the user space. The user interface corresponds to one storage device. In an example embodiment, the host obtains a swap request of the target application, and calls, based on the swap request, the user interface to perform an operation on the storage device. The swap request is a swap-in request or a swap-out request. The swap-out request is used to request to write data of the target application from a memory of the host to the storage device. The swap-in request is used to request to write data in the storage device to the memory.

17 Claims, 7 Drawing Sheets

DATA SWAPPING METHOD AND APPARATUS

CROSS-REFERENCE TO RELATED APPLICATIONS

This application is a continuation of International Application No. PCT/CN2022/097694, filed on Jun. 8, 2022, which claims priority to Chinese Patent Application No. 202110669020.8, filed on Jun. 16, 2021. The disclosures of the aforementioned applications are hereby incorporated by reference in their entireties.

TECHNICAL FIELD

This application relates to the field of storage technologies, and in particular, to a data swapping method and apparatus.

BACKGROUND

A host cannot run properly without an operating system, such as a Linux operating system. A kernel of the operating system supports memory swapping. To be specific, data in a memory of the host is swapped out to a storage device, or data in the storage device is swapped in to the memory. In addition to the operating system, various applications are installed on the host. With diversified development of applications, the various applications have diversified requirements for memory swapping. For example, storage devices used by different applications during memory swapping may be different. However, a storage device used when the kernel of the operating system performs memory swapping is usually a universal fixed device, so that diversified requirements of various applications for storage devices cannot be met.

SUMMARY

This application provides a data swapping method and apparatus, to resolve a problem that a memory swapping mechanism of a kernel of an operating system cannot meet diversified requirements of different applications.

To achieve the foregoing objective, the following technical solutions are used in this application:

According to a first aspect, this application provides a data swapping method, applied to a host. An operating system and a target application are installed on the host. The operating system includes user space. A user interface of the target application is disposed in the user space. The user interface corresponds to one storage device. An example solution includes: The host obtains a swap request of the target application, and calls, based on the swap request, the user interface to perform an operation on the storage device. The swap request is a swap-in request or a swap-out request. The swap-out request is used to request to write data of the target application from a memory of the host to the storage device. The swap-in request is used to request to write data in the storage device to the memory.

In this way, the user interface of the application is disposed in the user space, and the user interface is called to swap out or swap in the data of the application, thereby implementing memory swapping of a user mode. In this case, different user interfaces can be disposed for different applications, and the different user interfaces correspond to different storage devices, so that a customized user-mode memory swapping framework is provided for a user, diversified requirements of different applications for storage devices are met, and the user can design a memory swapping mechanism that the user wants.

In a possible implementation of this application, when the swap request is the swap-out request, the method for "calling, based on the swap request, the user interface to perform an operation on the storage device" may include: In response to the swap-out request, the host determines first data of the target application in the memory, removes, in a pre-stored page table, a mapping relationship between a first virtual address and a first physical address, allocates a second virtual address to the first data, and establishes a mapping relationship between the second virtual address and the first physical address. Then, the host calls the user interface, writes the first data indicated by the first physical address corresponding to the second virtual address from the memory to the storage device, and establishes, in the page table, a mapping relationship between the first virtual address and a first swap entry. The first swap entry indicates a location of the first data in the storage device. The first virtual address is a virtual address of the first data in a virtual memory, and the first physical address is an address of the first data in the memory.

In this way, a swap-out process, based on the second virtual address, of the first data is implemented, and correctness and reliability of a swap-out process of the user space are ensured.

In another possible implementation of this application, the data swapping method provided in this application may further include: The host removes the mapping relationship between the second virtual address and the first physical address, and deletes the first data in the memory.

Storage space of the first data in the memory is released, so that occupation of the memory can be reduced, and utilization of the memory can be improved.

In another possible implementation of this application, the data swapping method provided in this application may further include: The host sets status information of the first virtual address to first information. The first information indicates that a swap type of the first data corresponding to the first virtual address is a user-mode swap type.

In another possible implementation of this application, when the swap request is the swap-in request, the method for "obtaining a swap request of the target application" may include: The host obtains a virtual address of to-be-accessed second data, and generates the swap-in request when status information of the virtual address of the second data is first information, the second data is data of the target application, and the memory does not include the second data. The first information indicates that a swap type of the second data is a user-mode swap type.

In another possible implementation of this application, the method for "calling, based on the swap request, the user interface to perform an operation on the storage device" may include: In response to the swap-in request, the host obtains, based on a pre-stored page table, a second swap entry corresponding to the virtual address of the second data, calls the user interface, writes the second data indicated by the second swap entry from the storage device to the memory, and then establishes, in the page table, a mapping relationship between the virtual address of the second data and a physical address of the second data. The physical address of the second data is an address of the second data in the memory.

In this way, a swap-in process, based on page fault reporting, of the second data is implemented, and correctness and reliability of a swap-in process of the user space are ensured.

In another possible implementation of this application, before the host obtains a swap request of the target application, the data swapping method provided in this application may further include: The host establishes a swap-out thread and a swap-in thread after the target application is started. The swap-out thread is used to perform a swap-out operation of the first data. The swap-in thread is used to perform a swap-in operation of the second data.

In another possible implementation of this application, the method for "establishing a swap-out thread and a swap-in thread" may include: The host establishes the swap-out thread and the swap-in thread when the target application is included in a pre-stored trustlist. The trustlist includes at least one application that supports memory swapping.

In this way, the trustlist is preset, and only some specific applications are supported to perform memory swapping, so that overheads of the memory can be reduced, and thus performance of the host is improved.

According to a second aspect, this application provides a data swapping apparatus. The data swapping apparatus includes modules configured to perform the data swapping method according to the first aspect or any possible implementation of the first aspect.

According to a third aspect, this application provides a host. The host includes a memory and a processor. The memory is coupled to the processor. The memory is configured to store computer program code. The computer program code includes computer instructions. When the processor executes the computer instructions, the host performs the data swapping method according to the first aspect or any possible implementation of the first aspect.

According to a fourth aspect, this application provides a chip system. The chip system is applied to a host. The chip system includes one or more interface circuits and one or more processors. The interface circuit is interconnected to the processor through a line. The interface circuit is configured to: receive a signal from a memory of the host, and send the signal to the processor. The signal includes computer instructions stored in the memory. When the processor executes the computer instructions, the host performs the data swapping method according to the first aspect or any possible implementation of the first aspect.

According to a fifth aspect, this application provides a computer-readable storage medium. The computer-readable storage medium includes computer instructions, and when the computer instructions are run on a host, the host is enabled to perform the data swapping method according to the first aspect or any possible implementation of the first aspect.

According to a sixth aspect, this application provides a computer program product. The computer program product includes computer instructions, and when the computer instructions are run on a host, the host is enabled to perform the data swapping method according to the first aspect or any possible implementation of the first aspect.

For detailed descriptions of the second aspect to the sixth aspect and the implementations of the second aspect to the sixth aspect in this application, refer to detailed descriptions of the first aspect and the implementations of the first aspect. In addition, for beneficial effects of the second aspect to the sixth aspect and the implementations of the second aspect to the sixth aspect, refer to the analysis of beneficial effects of the first aspect and the implementations of the first aspect.

These aspects or other aspects in this application are more concise and comprehensible in the following descriptions.

DESCRIPTION OF EMBODIMENTS

Figure 1:
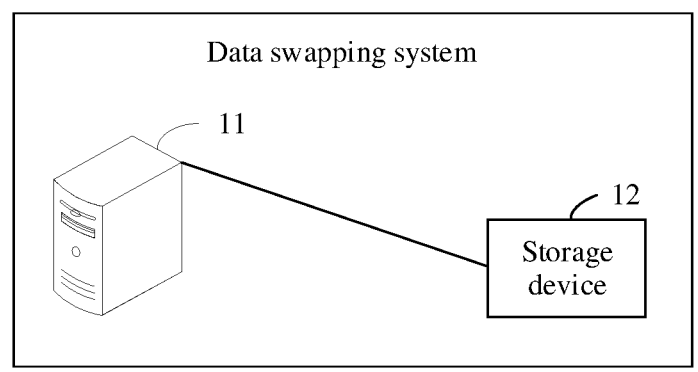
FIG. 1 is a schematic diagram of an exemplary data swapping system according to an embodiment of this application.

In embodiments of this application, words such as "example" or "for example" are used to represent giving an example, an illustration, or a description. Any embodiment or design described by "example" or "for example" in embodiments of this application should not be construed as being more preferred or advantageous than another embodiment or design. To be precise, the words such as "example" or "for example" are intended to present a related concept in a specific manner.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

With development of science and technology, increasingly more data is generated in life and work. Cold data in these data means data that is infrequently accessed but still needs to be retained for a long time. To reduce storage costs of the cold data, the cold data may be stored in a storage device through a memory swapping mechanism.

Currently, a process in which a kernel of an operating system performs memory swapping is as follows: When a host runs out of memory, the kernel of the operating system writes data that is infrequently accessed in the memory, namely, cold data, from the memory to a storage device, and deletes the cold data from the memory. When data written to the storage device needs to be accessed in the memory, the kernel of the operating system may write the data from the storage device to the memory. However, a storage device used when the kernel of the operating system performs memory swapping is usually a universal fixed device, so that diversified requirements of various applications for storage devices cannot be met.

To resolve a problem that a memory swapping mechanism of the kernel of the operating system cannot meet diversified requirements of different applications, an embodiment of this application provides a data swapping method. The method is applied to a host. An operating system and a target application are installed on the host. The operating system includes user space. A user interface of the target application is disposed in the user space. The user interface corresponds to one storage device. After obtaining a swap request of the target application, the host can call, based on the swap request, the user interface to perform an operation on the storage device. When the swap request is a swap-out request, the swap request is used to request to write data of the target application from a memory of the host to the storage device. When the swap request is a swap-in request, the swap request is used to request to write data in the storage device to the memory. In this way, the user interface of the application is disposed in the user space, and the user interface is called to swap out or swap in the data of the application, thereby implementing memory swapping of a user mode. In this case, different user interfaces can be disposed for different applications, and the different user interfaces correspond to different storage devices, so that diversified requirements of different applications for storage devices are met.

For ease of understanding by a person of ordinary skill in the art, terms in embodiments of this application are first briefly described herein.

1. Operating system

An operating system is essential system software of a host and is a soul of the host. Common operating systems may include a Windows operating system, a Linux operating system, and the like.

2. User space and kernel space

Logically, an operating system may include user space and kernel space. The user space is active space of an application, and is configured to store program code and data of the application. The kernel space is active space of the operating system, and is configured to store program code and data of the operating system or to store program code and data of a kernel of the operating system. Generally, the application or a process in the user space can access limited hardware resources of a host, and can access only some hardware resources. The operating system or kernel in the kernel space has permission to access all hardware resources of the host, and can access all hardware resources of the host. In addition, the application in the user space cannot directly access the hardware resources of the host, but can access the hardware resources through operating system call, a library function, or a script.

The data swapping method provided in this embodiment is applicable to a data swapping system. FIG. 1 shows an exemplary structure of the data swapping system. As shown in FIG. 1, the data swapping system may include a host 11 and a storage device 12. The host 11 and the storage device 12 establish a connection in a wired communication manner or a wireless communication manner.

The host 11 is configured to: obtain a swap request of a target application installed on the host 11, and call, based on the swap request, a user interface that is of the target application and that is disposed in user space, to perform an operation on the storage device 12 corresponding to the user interface. An operating system installed on the host 11 includes the user space.

It may be understood that when a plurality of target applications are installed on the host 11, a user interface of each target application may be disposed in the user space, that is, one target application corresponds to one user interface. User interfaces corresponding to different applications may be the same or different. In addition, one user interface corresponds to one storage device. Storage devices corresponding to a same user interface may be the same or different, and storage devices corresponding to different user interfaces may be the same or different. In this embodiment, the user interface corresponding to each application and the storage device corresponding to each user interface may be preconfigured in the host.

In some embodiments, the host 11 may be a terminal device, a server, a cloud computing platform, or the like. The terminal device may be a mobile phone, a tablet computer, a notebook computer, a palmtop computer, a computer, or the like. In FIG. 1, an example in which the host is a server is used for illustration.

In some embodiments, the storage device 12 may be a memory of another host other than the host 11, or may be a storage medium. A type of the storage medium may be a not and flash (NAND flash), a storage class memory (SCM), or the like.

It should be noted that, in this embodiment, the operating system installed on the host 11 may further include kernel space in addition to the user space. A kernel interface may be disposed in the kernel space, and the kernel interface corresponds to one storage device. The storage device is a device used when a kernel of an operating system performs memory swapping. A type of the storage device is generally a NAND flash, an SCM, or the like.

In addition, the data swapping system shown in FIG. 1 is merely used as an example, and is not used to limit the technical solution of embodiments of this application. A person of ordinary skill in the art should understand that, in a specific implementation process, the data swapping system may further include another node, and a quantity of nodes may be determined based on a specific requirement. This is not limited.

Figure 2:
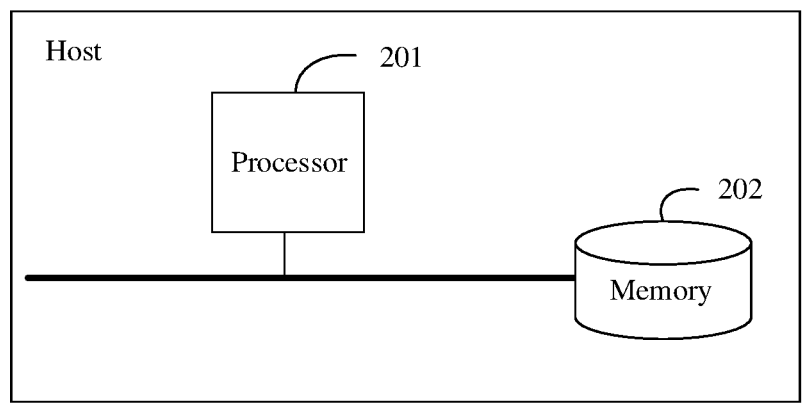
FIG. 2 is a schematic diagram 1 of a structure of an exemplary host according to an embodiment of this application.

FIG. 2 shows an exemplary structure of the foregoing host. As shown in FIG. 2, the host may include a processor 201 and a memory 202, and is configured to implement the data swapping method provided in this embodiment.

The processor 201 may be a general-purpose central processing unit (CPU), a microprocessor, an application-specific integrated circuit (ASIC), or one or more integrated circuits that are configured to control execution of a program in the solutions in this application.

For example, the processor 201 is configured to process a request from outside the host, for example, another host, and is further configured to process a request generated inside the host. In this embodiment, the processor 201 may be configured to process a swap request obtained by the host. The swap request is a swap-out request or a swap-in request.

The memory 202 is a memory that directly swaps data with the processor 201. The memory 202 can read and write data at a high speed at any time, and serves as a temporary data memory of an operating system or another running program. The memory 202 includes at least two types of memories. For example, the memory may be a random access memory or a read only memory (ROM). For example, the random access memory may be a dynamic random access memory (DRAM) or an SCM. The DRAM is a semiconductor memory. Like most random access memories (RAMs), the DRAM is a volatile memory. The SCM is a composite storage technology that combines characteristics of a conventional storage apparatus and a memory. The storage class memory can provide a higher read/write speed than a hard disk, but is slower than the DRAM in terms of an access speed and lower than the DRAM in terms of costs. It should be noted that the DRAM and the SCM are merely examples for description in this embodiment. The memory 202 may further include another random access memory, for example, a static random access memory (SRAM). The read only memory, for example, may be a programmable read only memory (PROM), an erasable programmable read only memory (EPROM), or the like, but is not limited thereto. In addition, the memory 202 may be alternatively a dual in-line memory module or a dual-line memory module (DIMM), namely, a module formed by the DRAM, or may be a solid state disk (SSD). The memory 202 may exist independently, and is coupled to the processor 201. Alternatively, the memory 202 may be integrated with the processor 201.

In an actual application, a plurality of memories may be disposed in the host. The plurality of memories may be memories of a same type, or may be memories of different types. In this embodiment, a quantity and a type of memories of the host are not limited. In FIG. 2, only one memory 202 is used as an example for illustration. In addition, the memory 202 may be configured to have a power loss protection function. The power loss protection function means that data stored in the memory 202 is not lost even when a system is powered on again after power loss. The memory with the power loss protection function is called a non-volatile memory.

The memory 202 stores program code and data of an application installed on the host, and code and data of an operating system installed on the host. The application is a program running on a basis of the operating system.

It should be noted that the structure shown in FIG. 2 does not constitute a limitation on the host. In addition to the components shown in FIG. 2, the host may include more or fewer components than those shown in the figure, or combine some components, or have different component arrangements. For example, the host may further include input/output devices such as an audio card, an optical disk driver, a hard disk, a display, a keyboard, a mouse, a speaker, a handwriting pad, a microphone, and a camera.

Figure 3:
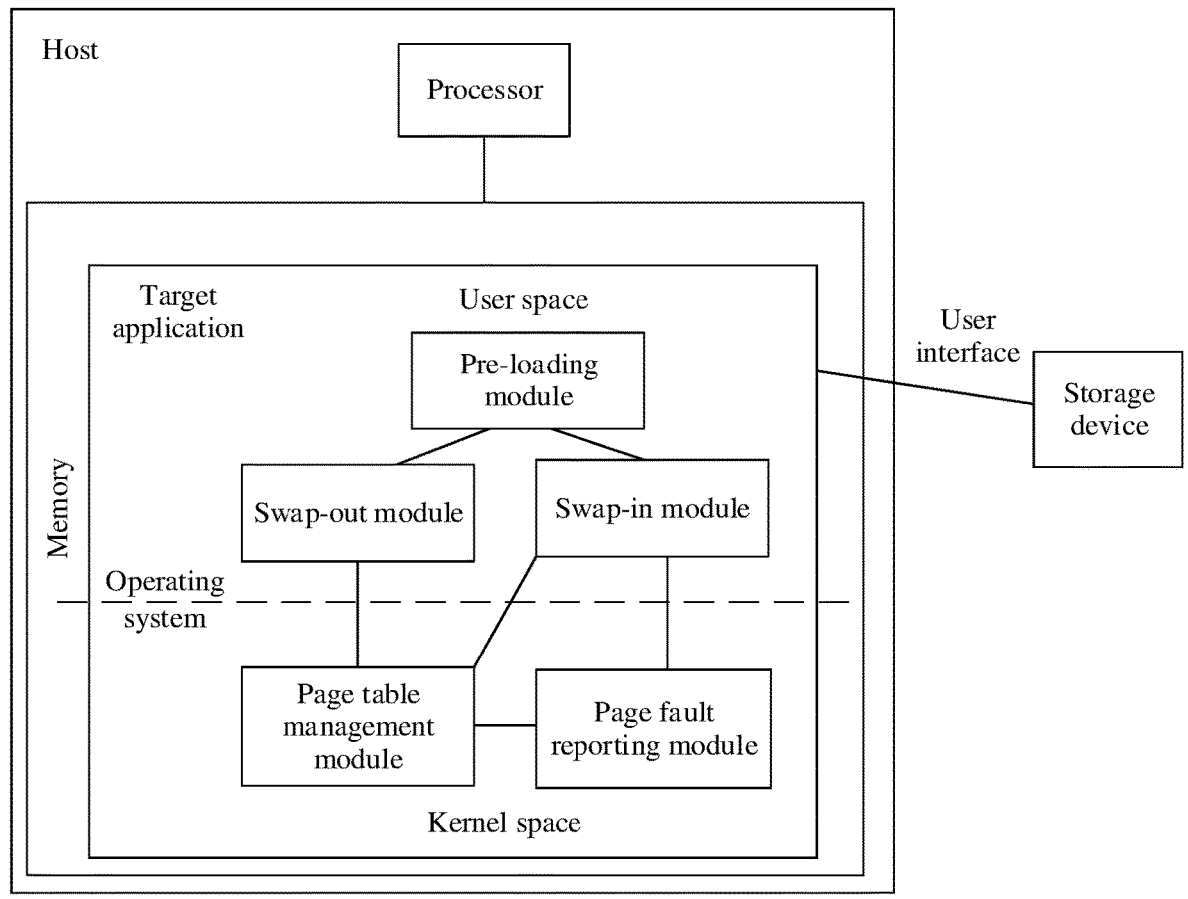
FIG. 3 is a schematic diagram 2 of a structure of an exemplary host according to an embodiment of this application.

With reference to FIG. 1 and FIG. 2, FIG. 3 shows an exemplary structure of a host according to an embodiment. As shown in FIG. 3, an operating system and at least one target application are installed on the host. The operating system may include user space and kernel space. The user space includes program code and data of each of the at least one application. The kernel space includes program code and data of a kernel of the operating system. In addition, a user interface of each of the at least one application is disposed in the user space. In an example implementation, in the user space, program code of each application may include a driver or a protocol stack corresponding to a user interface of the application. The user interface of the application can be called by running the driver or the protocol stack.

In the host, the user space may include a pre-loading module, a swap-out module, and a swap-in module. The kernel space may include a page table management module and a page fault reporting module. These modules can work together to implement a memory swapping mechanism of a user mode. In this embodiment, a memory swapping method of the user mode is described in detail by using one target application as an example. A memory swapping method of another target application is similar.

The page table management module is configured to manage a page table of the host. The page table is a data storage structure, and is used to store a mapping relationship between a virtual address (VA) and a physical address (PA) of data. The virtual address is a logical address of the data in a virtual memory, and the physical address is a real address of the data in the memory. In an implementation, the data stored in the page table may be implemented through a hash table.

The pre-loading module is configured to: after the target application is started, establish a swap-out thread and a swap-in thread, and initialize related resources. The swap-out thread is used to perform a swap-out operation of first data. The swap-in thread is used to perform a swap-in operation of second data. The related resources refer to various resources needed for swapping out the first data or swapping in the second data.

For example, the related resources may include the page table. Optionally, the related resources may further include a swap cache. The swap cache is a part of storage space divided from the memory of the host, and is configured to temporarily store the first data when the first data is swapped out from the memory to a storage device. After the swap cache is full of data, the data in the swap cache is stored to the storage device.

Optionally, the pre-loading module is specifically configured to: after the target application is started, establish the swap-in thread and the swap-out thread by loading program code of the target application in the user space, and initialize the related resources.

Optionally, because not all applications support the memory swapping mechanism of the user mode, before establishing the swap-out thread and the swap-in thread, the pre-loading module may first determine whether the target application is included in a pre-stored trustlist. The trustlist includes at least one application that supports memory swapping. When it is determined that the target application is included in the trustlist, the pre-loading module establishes the swap-out thread and the swap-in thread. Otherwise, the pre-loading module does not perform any operation. An application included in the trustlist may be an application that occupies a large memory, for example, a game application or a video application. Applications that occupy a small memory, such as a calendar and a calculator, are not included in the trustlist because a data volume of these applications is small and memory swapping is not needed. In this way, the trustlist is preset, and only some specific applications are supported to perform memory swapping, so that overheads of the memory can be reduced, and thus performance of the host is improved.

After the pre-loading module establishes the swap-out thread and the swap-in thread, the swap-out module may wait to receive a swap-out request, and the swap-in module may wait to receive a swap-in request. The following first describes a case in which the swap-out module receives the swap-out request.

Figure 4A:
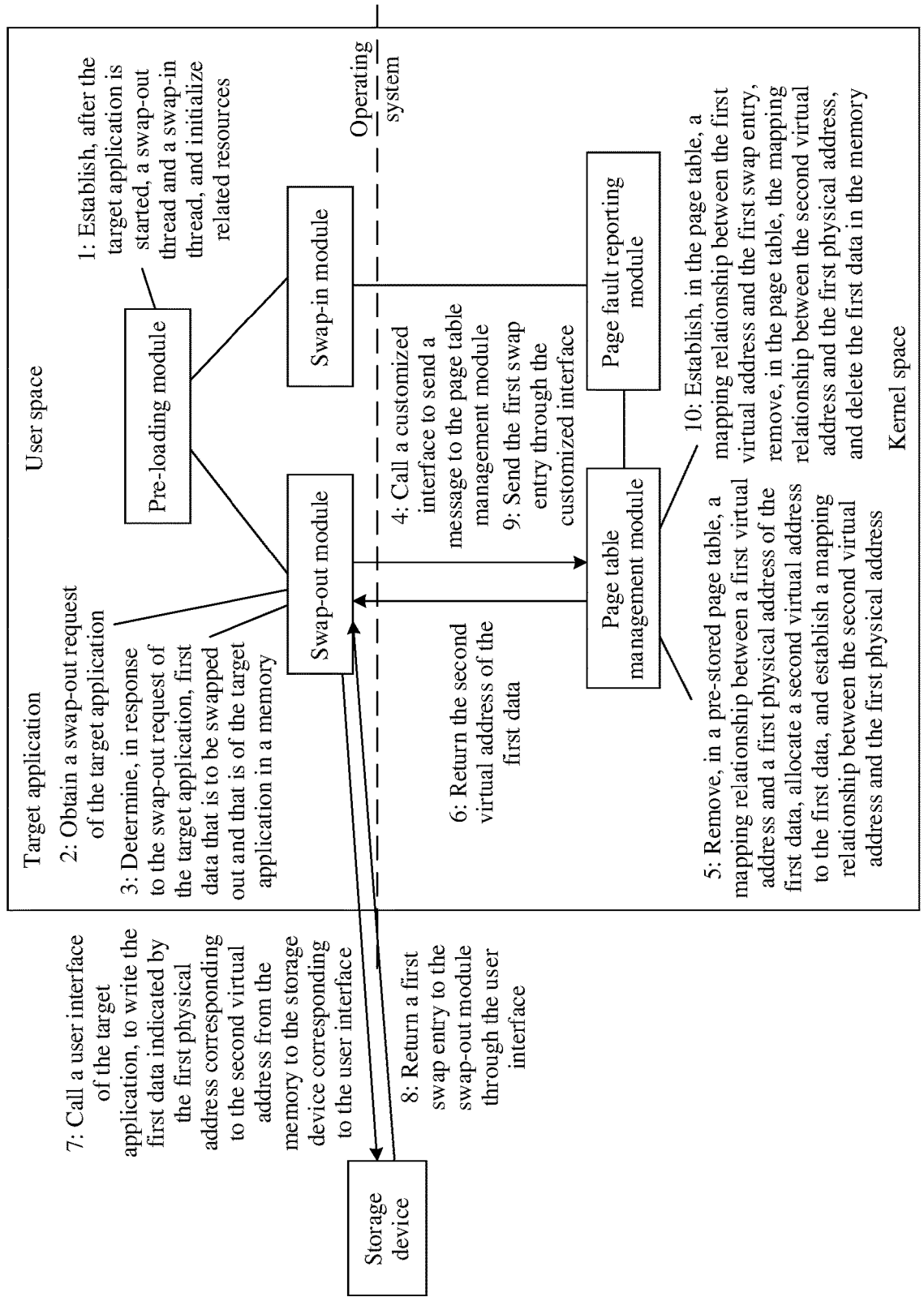
FIG. 4a is an exemplary schematic diagram of swapping out user-mode data according to an embodiment of this application.

FIG. 4a shows an exemplary swap-out process of first data. As shown in FIG. 4a, a swap-out module is configured to: obtain a swap-out request of a target application, and call a swap-out thread to swap out the first data. The swap-out request is used to request to write data of the target application from a memory of a host to a storage device corresponding to a user interface of the target application.

It may be understood that the swap-out module may generate the swap-out request of the target application in response to a swap-out operation performed by a user on the target application. Alternatively, when it is determined that a memory for running the target application is insufficient, the swap-out module may generate the swap-out request of the target application. A manner of triggering the swap-out request is not limited in this embodiment.

For example, it is assumed that a memory capacity of the host is 13 G, and two applications are currently run on the host and use 10 G of the memory. In this case, the user starts another application. If running the another application by the host needs to use 5 G of the memory, when it is determined that the memory for running the another application is insufficient, the host generates a swap-out request of the another application.

The swap-out module is further configured to determine, in response to the swap-out request of the target application, the first data that is to be swapped out and that is of the target application in the memory. The first data may be cold data of the target application, namely, data that is infrequently accessed but needs to be stored for a long time of the target application. For example, when the target application is a game application, the first data may be historical record data of the game application.

The swap-out module is further configured to, after the first data of the target application is determined, determine whether the first data is allowed to be swapped out. If it is determined that the first data is not allowed to be swapped out, the swap-out module ends the swap-out process of the first data. If it is determined that the first data is allowed to be swapped out, the swap-out module may send a message to a page table management module by calling a customized interface. The message is used by the swap-out module to notify the page table management module that the first data is data that is to be swapped out. The customized interface is an interface for communication between user space and kernel space.

After receiving the message sent by the swap-out module, the page table management module may remove, in a pre-stored page table, a mapping relationship between a first virtual address and a first physical address of the first data, allocate a second virtual address to the first data, and establish a mapping relationship between the second virtual address and the first physical address. Finally, the page table management module is further configured to return the second virtual address of the first data to the swap-out module through the customized interface. The first virtual address and the second virtual address are two different virtual addresses of the first data in a virtual memory. The first physical address is a real address of the first data in the memory.

Optionally, in this embodiment, the page table management module is further configured to, after a message from a swap-out module in the user space is received, set status information of the first virtual address to first information. The first information indicates that a swap type of the first data corresponding to the first virtual address is a user-mode swap type. Alternatively, the page table management module is further configured to, after a message from a swap-out module in the kernel space is received, set status information of the first virtual address to second information. The second information indicates that a swap type of the first data corresponding to the first virtual address is a kernel-mode swap type.

The swap-out module is further configured to: receive the second virtual address that is of the first data and that is sent by the page table management module, call the user interface of the target application by running a driver or a protocol stack of the target application, and write, based on the mapping relationship between the second virtual address and the first physical address in the page table, the first data indicated by the first physical address corresponding to the second virtual address from the memory to the storage device corresponding to the user interface. The data written to the storage device is third data. After successfully writing the third data, the storage device may return a first swap entry to the swap-out module through the user interface. The first swap entry indicates a location of the third data in the storage device.

Figure 4B:
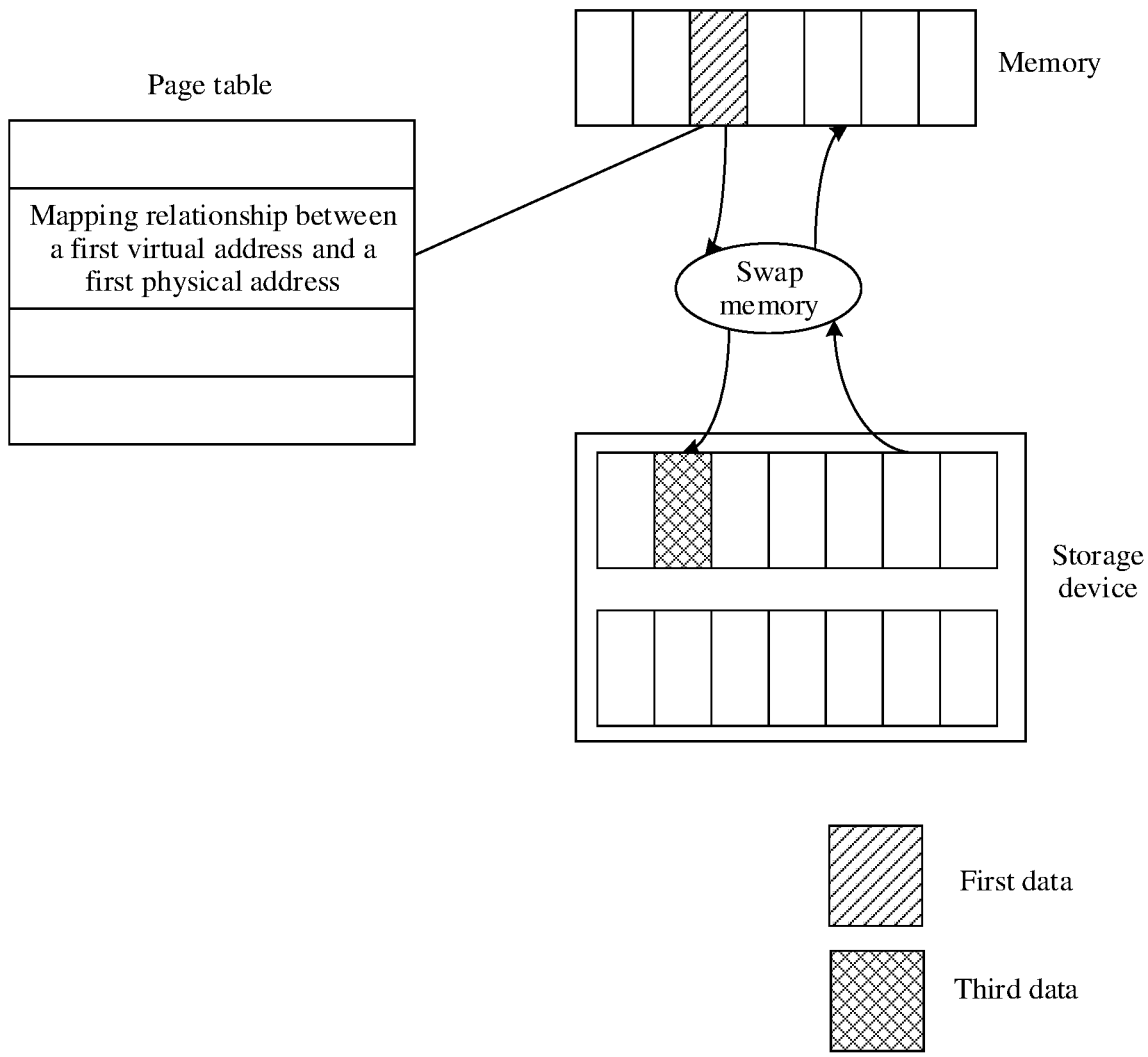
FIG. 4b is a schematic diagram of an exemplary scenario of swapping out first data according to an embodiment of this application.

Optionally, in this embodiment, as shown in FIG. 4b, the swap-out module may call the user interface of the target application, and first write the first data from the memory to the swap cache. The data written to the swap cache is swap data. After storage space of the swap cache is full, the swap data may be written from the swap cache to the storage device corresponding to the user interface. In this case, the data written to the storage device is the third data.

It should be noted that in this embodiment, the first data, the third data, and the swap data are same data respectively stored in the memory, the storage device, and the swap cache. Only a location at which the data is stored changes, and content of the data is the same. In addition, after the first data is written from the memory to the storage device, when the first data needs to be accessed in the memory, the third data may be written from the storage device to the memory. In this case, a virtual address of the data written to the memory and the virtual address of the first data are a same virtual address.

The swap-out module is further configured to, after the first swap entry is received, send the first swap entry to the page table management module through the customized interface.

The page table management module is further configured to, after the first swap entry is received, establish, in the page table, a mapping relationship between the first virtual address and the first swap entry. The page table management module is further configured to: remove the mapping relationship between the second virtual address and the first physical address in the page table, and delete the first data in the memory. In this way, swap-out of the first data is completed. Storage space of the first data in the memory is released, so that occupation of the memory can be reduced, and utilization of the memory can be improved.

Optionally, in this embodiment, the page table management module is further configured to, after the mapping relationship between the first virtual address and the first swap entry is established, set status information of the first swap entry to third information. The third information indicates that the third data indicated by the first swap entry is data swapped out from the memory to the storage device.

In this way, as shown in FIG. 4a, the swap-out process, based on the second virtual address, of the first data is implemented, and correctness and reliability of a swap-out process of the user space are ensured.

After a case in which the swap-out module receives the swap-out request is described, a case in which the swap-in module receives the swap-in request is described below.

Figure 5:
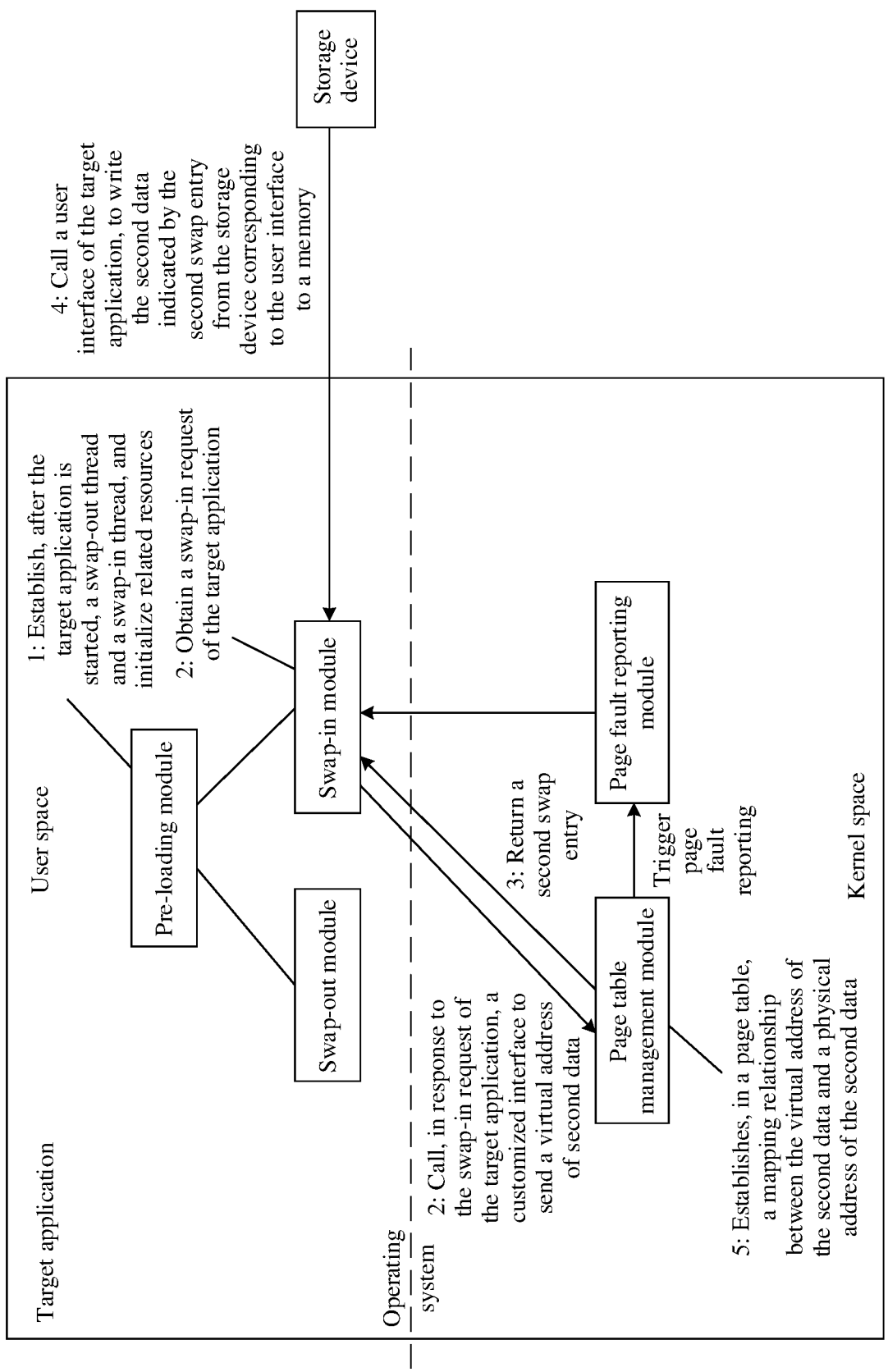
FIG. 5 is an exemplary schematic diagram of swapping in user-mode data according to an embodiment of this application.

FIG. 5 shows an exemplary swap-in process of second data. As shown in FIG. 5, a swap-in module is configured to: obtain a swap-in request of a target application, and call a swap-in thread to swap in the second data. The swap-in request is used to request to write data in a storage device corresponding to a user interface of the target application to a memory.

It may be understood that when a user needs to view the second data of the target application, the user may perform a view operation on a host. A processor in the host generates, in response to the view operation of the user, a data access request, and sends the data access request to a page table management module. The data access request may include data access information. For example, the data access information may be a virtual address of the second data. After receiving the data access request, the page table management module may query a page table for the virtual address of the second data. If data location information corresponding to the virtual address of the second data in the page table is a physical address, it indicates that the second data is stored in the memory. In this case, the second data may be obtained from the memory based on the physical address. If status information of data location information corresponding to the virtual address of the second data in the page table is third information, it indicates that the data location information stored in the page table is a second swap entry, and the second data is not stored in the memory. The page table management module may send an indication message to a page fault reporting module, to trigger page fault reporting. After receiving the indication message sent by the page table management module, the page fault reporting module may determine whether the current swap-in operation is kernel-mode swap-in or user-mode swap-in. Specifically, the page fault reporting module may determine whether the status information of the virtual address of the second data in the page table is first information or second information. If the status information of the virtual address of the second data is the first information, it indicates that a swap type of the second data is a user-mode swap type. In this case, the page fault reporting module may generate the swap-in request of the target application when determining that the second data is data of the target application, and then send the swap-in request of the target application to a swap-in module in user space by using a user fault handling function (userfaultfd) or a signal handling function (signal). The swap-in request may include the virtual address of the second data. In this way, the swap-in module in the user space may obtain the swap-in request of the target application. If the status information of the virtual address of the second data is the second information, it indicates that a swap type of the second data is a kernel-mode swap type. In this case, the page fault reporting module may send the swap-in request to a swap-in module in kernel space, so that the swap-in module swaps in the second data.

It should be noted that, in this embodiment, the second data is data swapped out from the memory to the storage device, and the userfaultfd or the signal may be registered in a swap-out process of the second data. Specifically, registration may be performed after a swap-out module determines that the second data is allowed to be swapped out. The swap-out process of the second data is the same as the swap-out process of the first data in the foregoing embodiment.

The swap-in module is further configured to: in response to the swap-in request of the target application, call a customized interface, obtain, from the page table through the page table management module, the second swap entry corresponding to the virtual address of the second data, and call the user interface of the target application, to write the second data indicated by the second swap entry from the storage device corresponding to the user interface to the memory.

In an example implementation, before writing the second data from the storage device to the memory, the swap-in module may first apply for a third virtual address and a third physical address. After applying for the addresses, the swap-in module may copy the second data from the storage device to a location corresponding to the third physical address, and establish a mapping relationship between the third virtual address and the third physical address. In this case, the data stored in the third physical address is fourth data. Then, the swap-in module may indicate the page table management module to apply for a new physical address for the second data, copy the fourth data indicated by the third physical address corresponding to the third virtual address to a location corresponding to the new physical address, establish, in the page table, a mapping relationship between the virtual address of the second data and the physical address of the second data, remove the mapping relationship between the third virtual address and the third physical address, and delete the fourth data stored in the third physical address. The data stored in the physical address of the second data is fifth data. In this way, swap-in of the second data is completed, and data may be read and written in the memory.

Optionally, in this embodiment, the swap-in module may call the user interface of the target application, and write the second data from the storage device corresponding to the user interface to a buffer. The data written to the buffer is buffered data. After the third virtual address and the third physical address are applied for the second data, the buffered data is written from the buffer to the location corresponding to the third physical address. The data written to the third physical address is the fourth data. Finally, after the physical address of the second data is applied for, the fourth data is copied from the third physical address to the location corresponding to the physical address of the second data. The data written to the physical address of the second data is the fifth data.

It may be understood that the buffer is also a part of storage space divided from the memory, and is configured to temporarily store data when the second data in the storage device is swapped in to the memory. After the physical address is applied for the second data in the memory, the data in the buffer is written to the physical address applied for, to avoid a problem that the host is slow in swap speed due to a low read/write speed of the storage device.

It should be noted that in this embodiment, the second data, the fourth data, the fifth data, and the buffered data are same data respectively stored in the storage device, the third physical address in the memory, the physical address of the second data in the memory, and the buffer. Only a location at which the data is stored changes, and content of the data is the same. In addition, if the second data is data obtained by writing initial data from the memory to the storage device, a virtual address of the initial data and a virtual address of the fifth data are a same virtual address.

In this way, as shown in FIG. 5, the swap-in process, based on page fault reporting, of the second data is implemented, and correctness and reliability of a swap-in process of the user space are ensured.

With reference to FIG. 1 to FIG. 5, the following specifically describes the data swapping method provided in embodiments of this application.

It may be understood that a same step or a step or a technical feature having a same function in embodiments of this application may be mutually referenced in different embodiments.

It may be understood that, in embodiments of this application, the host may perform some or all of steps in embodiments of this application. These steps are merely examples. In embodiments of this application, other steps or variations of various steps may be further performed. In addition, the steps may be performed in a sequence different from a sequence presented in embodiments of this application, and not all the steps in embodiments of this application need to be performed.

In embodiments of this application, an example structure of an execution body of the data swapping method is not particularly limited, provided that the method provided in embodiments of this application can be implemented. For example, the execution body of the data swapping method provided in embodiments of this application may be a host, or a component applied to a host, for example, a chip. This is not limited in embodiments of this application. The following embodiment is described by using an example in which the execution body of the data swapping method is a host.

Figure 6:
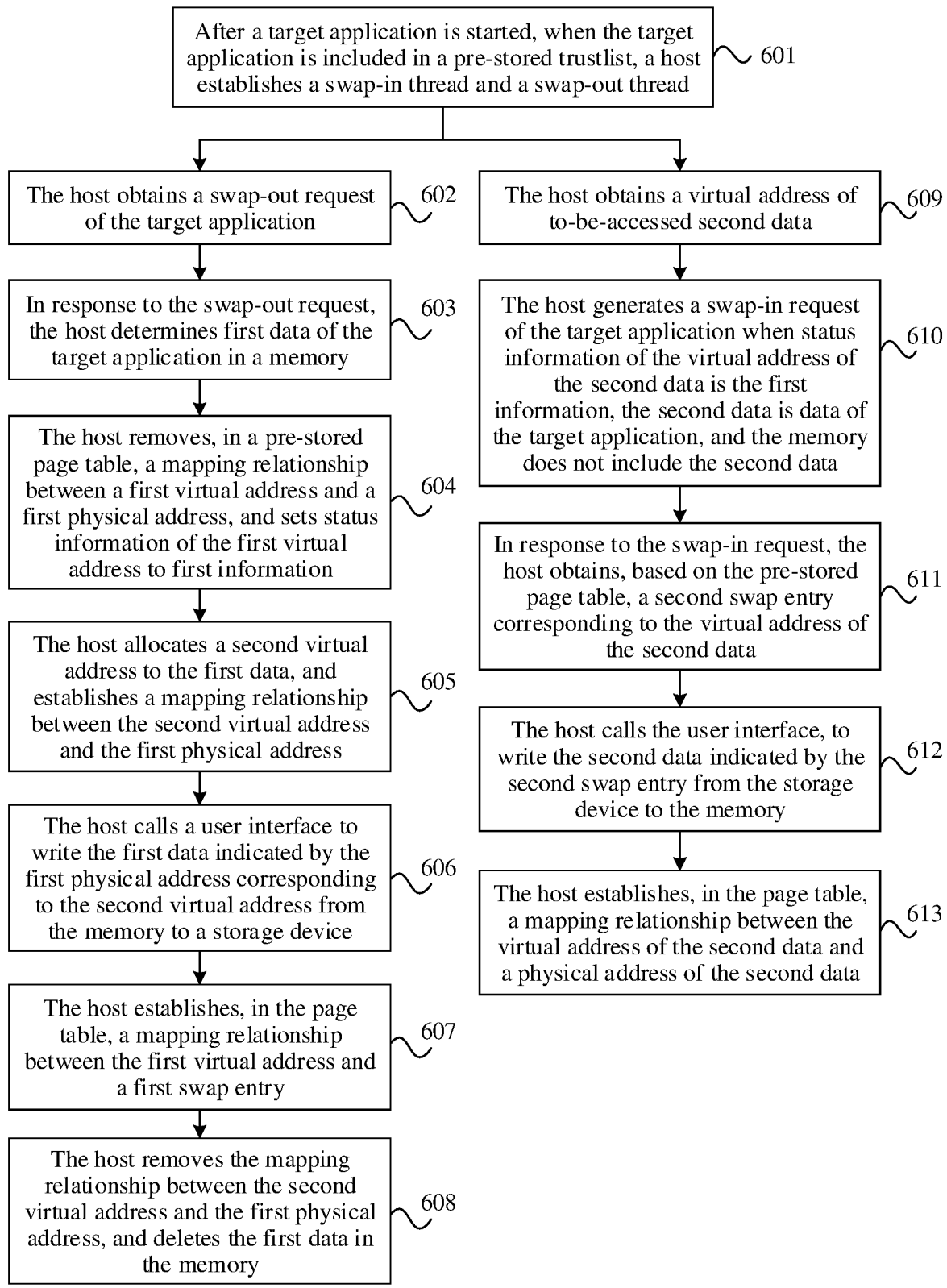
FIG. 6 is a schematic flowchart of an exemplary data swapping method according to an embodiment of this application.

As shown in FIG. 6, an exemplary data swapping method provided in this embodiment may include the following step 601 to step 613. Step 601 is a preparation operation performed before a pre-loading module in user space performs memory swapping. Step 602 to step 608 are a process of swapping out first data from a memory to a storage device. Step 609 to step 613 are a process of swapping in second data from the storage device to the memory.

601: After a target application is started, when the target application is included in a pre-stored trustlist, the host establishes a swap-in thread and a swap-out thread.

The trustlist includes at least one application that supports memory swapping. The swap-out thread is used to perform a swap-out operation of the first data. The swap-in thread is used to perform a swap-in operation of the second data.

It should be noted that, for specific descriptions of step 601, reference may be made to related descriptions of establishing, by the pre-loading module, a swap-out thread and a swap-in thread in another embodiment.

602: The host obtains a swap-out request of the target application.

603: In response to the swap-out request, the host determines first data of the target application in the memory.

604: The host removes a mapping relationship between a first virtual address and a first physical address in a pre-stored page table, and sets status information of the first virtual address to first information.

The first virtual address is a virtual address of the first data in a virtual memory. The first physical address is an address of the first data in the memory.

605: The host allocates a second virtual address to the first data, and establishes a mapping relationship between the second virtual address and the first physical address.

606: The host calls a user interface to write the first data indicated by the first physical address corresponding to the second virtual address from the memory to the storage device.

607: The host establishes, in the page table, a mapping relationship between the first virtual address and a first swap entry.

The first swap entry indicates a location of the first data in the storage device.

608: The host removes the mapping relationship between the second virtual address and the first physical address, and deletes the first data in the memory.

It should be noted that, for specific descriptions of step 602 to step 608, reference may be made to related descriptions in another embodiment in which the swap-out module and the page table management module swap out the first data from the memory to the storage device.

609: The host obtains a virtual address of to-be-accessed second data.

610: The host generates a swap-in request of the target application when status information of the virtual address of the second data is the first information, the second data is data of the target application, and the memory does not include the second data.

611: In response to the swap-in request, the host obtains, based on the pre-stored page table, a second swap entry corresponding to the virtual address of the second data.

612: The host calls the user interface, to write the second data indicated by the second swap entry from the storage device to the memory.

613: The host establishes, in the page table, a mapping relationship between the virtual address of the second data and a physical address of the second data.

The physical address of the second data is an address of the second data in the memory.

It should be noted that, for specific descriptions of step 609 to step 613, reference may be made to related descriptions in another embodiment in which the swap-in module, the page table management module, and the page fault reporting module swap in the second data from the storage device to the memory.

An embodiment of this application provides a data swapping method. The method is applied to a host. An operating system and a target application are installed on the host. The operating system includes user space. A user interface of the target application is disposed in the user space. The user interface corresponds to one storage device. After obtaining a swap request of the target application, the host can call, based on the swap request, the user interface to perform an operation on the storage device. When the swap request is a swap-out request, the swap request is used to request to write data of the target application from a memory of the host to the storage device. When the swap request is a swap-in request, the swap request is used to request to write data in the storage device to the memory. In this way, the user interface of the application is disposed in the user space, and the user interface is called to swap out or swap in the data of the application, thereby implementing memory swapping of a user mode. In this case, different user interfaces can be disposed for different applications, and the different user interfaces correspond to different storage devices, so that a customized user-mode memory swapping framework is provided for a user, diversified requirements of different applications for storage devices are met, and the user can design a memory swapping mechanism that the user wants.

Further, because a speed of a read/write process of the user mode is higher than that of a read/write process of a kernel mode, performance of memory swapping of the user mode is higher than performance of memory swapping of the kernel mode. To achieve higher performance, a driver or a protocol stack of the current storage device is moved up to the user mode. As a result, a memory swapping mechanism of the kernel mode cannot use the storage device moved up to the user mode. In this embodiment, a memory swapping mechanism of the user mode is implemented. The mechanism can use the storage device moved up to the user mode. The memory swapping mechanism of the user mode is tested in scenarios of a relational database management system (mysql) and a service processing specification (TPCC). A swap-out or swap-in delay is at a microsecond level, and memory swapping of the user mode is performed without being perceived by a user, so that user experience is improved.

For example, it is assumed that in the mysql and TPCC scenarios, the host swaps out 28% of data in the memory. Table 1 shows related parameters of performance of the memory swapping mechanism of the user mode. It can be learned from Table 1 that when the host swaps out data, a performance loss is only 2%, and a performance loss of the memory swapping mechanism of the kernel mode is greater than 2%.

TABLE 1

| Transactions per second (transactions per second, TPS) | | | Average memory consumption/G | | |
| --- | --- | --- | --- | --- | --- |
| Baseline | User-mode swapping | Performance reduction/% | Baseline | User-mode swapping | Memory saving/% |
| 155575 | 152500 | 1.9% | 43.9 | 31.7 | 27.79% |

The foregoing mainly describes the solutions provided in embodiments of this application from a method perspective. To implement the foregoing functions, corresponding hardware structures and/or software modules for performing the functions are included. A person of ordinary skill in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of this application.

Figure 7:
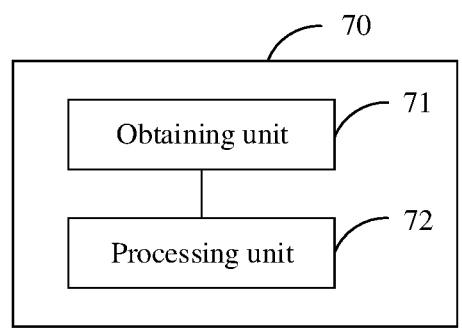
FIG. 7 is a schematic diagram 1 of an exemplary structure of a data swapping apparatus according to an embodiment of this application.

FIG. 7 is a schematic diagram of an exemplary structure of a data swapping apparatus 70 according to an embodiment of this application. The data swapping apparatus 70 may be a host, or may be a CPU in a host, or may be a control module in a host, or may be a client in a host. The data swapping apparatus 70 is configured to perform the data swapping method shown in FIG. 6. The data swapping apparatus 70 may include an obtaining unit 71 and a processing unit 72.

The obtaining unit 71 is configured to obtain a swap request of a target application. The swap request is a swap-in request or a swap-out request. The swap-out request is used to request to write data of the target application from a memory of a host to a storage device. The swap-in request is used to request to write data in the storage device to the memory. For example, with reference to FIG. 6, the obtaining unit 71 may be configured to perform step 602 and step 610. The processing unit 72 is configured to call, based on the swap request obtained by the obtaining unit 71, a user interface to perform an operation on the storage device.

Optionally, when the swap request is the swap-out request, the processing unit 72 is specifically configured to: in response to the swap-out request, determine first data of the target application in the memory, remove, in a pre-stored page table, a mapping relationship between a first virtual address and a first physical address, allocate a second virtual address to the first data, and establish a mapping relationship between the second virtual address and the first physical address. Then, the user interface is called to write the first data indicated by the first physical address corresponding to the second virtual address from the memory to the storage device, and a mapping relationship between the first virtual address and a first swap entry is established in the page table. The first swap entry indicates a location of the first data in the storage device. The first virtual address is a virtual address of the first data in a virtual memory, and the first physical address is an address of the first data in the memory.

Figure 8:
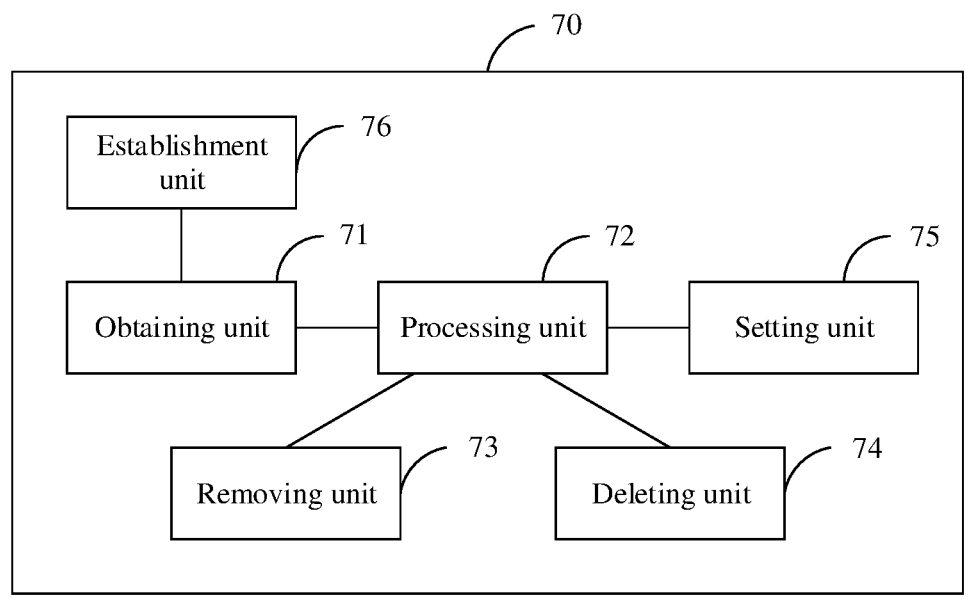
FIG. 8 is a schematic diagram 2 of an exemplary structure of a data swapping apparatus according to an embodiment of this application.

Optionally, as shown in FIG. 8, the data swapping apparatus 70 further includes a removing unit 73 and a deleting unit 74. The removing unit 73 is configured to remove the mapping relationship between the second virtual address and the first physical address. For example, with reference to FIG. 6, the removing unit 73 may be configured to remove the mapping relationship between the second virtual address and the first physical address in step 608. The deleting unit 74 is configured to delete the first data in the memory. For example, with reference to FIG. 6, the deleting unit 74 may be configured to delete the first data in the memory in step 608.

Optionally, as shown in FIG. 8, the data swapping apparatus 70 further includes a setting unit 75. The setting unit 75 is configured to set status information of the first virtual address to first information. The first information indicates that a swap type of the first data corresponding to the first virtual address is a user-mode swap type.

Optionally, when the swap request is the swap-in request, the obtaining unit 71 is specifically configured to: obtain a virtual address of to-be-accessed second data; and generate the swap-in request when status information of the virtual address of the second data is the first information, the second data is data of the target application, and the memory does not include the second data. The first information indicates that a swap type of the second data is a user-mode swap type.

Optionally, the processing unit 72 is specifically configured to: in response to the swap-in request, obtain, based on the pre-stored page table, a second swap entry corresponding to the virtual address of the second data; call the user interface to write the second data indicated by the second swap entry from the storage device to the memory; and establish, in the page table, a mapping relationship between the virtual address of the second data and a physical address of the second data. The physical address of the second data is an address of the second data in the memory.

Optionally, as shown in FIG. 8, the data swapping apparatus 70 further includes an establishment unit 76. The establishment unit 76 is configured to, after the target application is started, establish a swap-out thread and a swap-in thread. The swap-out thread is used to perform a swap-out operation of the first data. The swap-in thread is used to perform a swap-in operation of the second data. For example, with reference to FIG. 6, the establishment unit 76 may be configured to perform step 601.

Optionally, the establishment unit 76 is specifically configured to, when the target application is included in a pre-stored trustlist, establish the swap-out thread and the swap-in thread. The trustlist includes at least one application that supports memory swapping.

Certainly, the data swapping apparatus 70 provided in this embodiment includes but is not limited to the foregoing modules.

In actual implementation, the obtaining unit 71, the processing unit 72, the removing unit 73, the deleting unit 74, the setting unit 75, and the establishment unit 76 may be implemented by the processor 201 shown in FIG. 2 by calling the program code in the memory 202. For an example execution process, refer to the description of the part of the data swapping method shown in FIG. 6.

Another embodiment of this application further provides a computer-readable storage medium. The computer-readable storage medium stores computer instructions. When the computer instructions are run on a host, the host is enabled to perform the steps performed by the host in the method procedures shown in the foregoing method embodiments.

Another embodiment of this application further provides a chip system. The chip system is applied to a host. The chip system includes one or more interface circuits and one or more processors. The interface circuit is interconnected to the processor through a line. The interface circuit is configured to: receive a signal from a memory of the host, and send the signal to the processor. The signal includes computer instructions stored in the memory. When the processor executes the computer instructions, the host performs the steps performed by the host in the method procedures shown in the foregoing method embodiments.

In another embodiment of this application, a computer program product is further provided. The computer program product includes computer instructions. When the computer instructions are run on a host, the host is enabled to perform the steps performed by the host in the method procedures shown in the foregoing method embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer-executable instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely non-limiting examples of implementations and are not intended to limit the protection scope, which is intended to cover any variation or replacement readily determined by a person of ordinary skill in the art.

What is claimed is:

1. A data swapping method, applied to a host, wherein an operating system and a target application are installed on the host, the operating system comprises user space, a user interface of the target application is disposed in the user space, the user interface corresponds to a storage device, and the method comprises:
   obtaining a swap request of the target application, wherein the swap request is a swap-out request requesting to write data of the target application from a memory of the host to the storage device, or a swap-in request requesting to write data in the storage device to the memory; and
   calling, based on the swap request, the user interface to perform an operation on the storage device,
   wherein when the swap request is the swap-out request, the calling, based on the swap request, the user interface to perform the operation on the storage device comprises:
   determining, in response to the swap-out request, first data of the target application in the memory;
   removing, in a pre-stored page table, a mapping relationship between a first virtual address and a first physical address, wherein the first virtual address is a virtual address of the first data in a virtual memory, and the first physical address is an address of the first data in the memory;
   allocating a second virtual address to the first data, and establishing a second mapping relationship between the second virtual address and the first physical address;
   calling the user interface to write the first data indicated by the first physical address corresponding to the second virtual address from the memory to the storage device; and
   establishing, in the pre-stored page table, a third mapping relationship between the first virtual address and a first swap entry, wherein the first swap entry indicates a location of the first data in the storage device.

2. The data swapping method according to claim 1, further comprising:
   removing the second mapping relationship between the second virtual address and the first physical address, and deleting the first data from the memory.

3. The data swapping method according to claim 1, further comprising:
   setting status information of the first virtual address to first information, wherein the first information indicates that a swap type of the first data corresponding to the first virtual address is a user-mode swap type.

4. The data swapping method according to claim 1, wherein when the swap request is the swap-in request, the obtaining a swap request of the target application comprises:
   obtaining a virtual address of to-be-accessed second data; and
   generating the swap-in request when status information of the virtual address of the second data is first information, the second data is data of the target application, and the memory does not comprise the second data, wherein the first information indicates that a swap type of the second data is a user-mode swap type.

5. The data swapping method according to claim 4, wherein the calling, based on the swap request, the user interface to perform an operation on the storage device comprises:
   in response to the swap-in request, obtaining, based on a pre-stored page table, a second swap entry corresponding to the virtual address of the second data;
   calling the user interface to write the second data indicated by the second swap entry from the storage device to the memory; and
   establishing a fourth mapping relationship between the virtual address of the second data and a physical address of the second data in the pre-stored page table, wherein the physical address of the second data is an address of the second data in the memory.

6. The data swapping method according to claim 4, wherein before the obtaining a swap request of the target application, the data swapping method further comprises:
   after the target application is started, establishing a swap-out thread and a swap-in thread, wherein the swap-out thread is used to perform a swap-out operation of the first data, and the swap-in thread is used to perform a swap-in operation of the second data.

7. The data swapping method according to claim 6, wherein the establishing a swap-out thread and a swap-in thread comprises:
when the target application is comprised in a pre-stored trustlist, establishing the swap-out thread and the swap-in thread, wherein the trustlist comprises at least one application that supports memory swapping.

8. A data swapping apparatus in a host, wherein the data swapping apparatus comprises a memory and a processor; the memory is coupled to the processor, the memory is configured to store computer program code comprising computer instructions that, when executed by the processor, cause the data swapping apparatus to perform a data swapping method, wherein an operating system and a target application are installed on the host, the operating system comprises user space, a user interface of the target application is disposed in the user space, the user interface corresponds to a storage device, and the data swapping method comprises:
obtaining a swap request of the target application, wherein the swap request is a swap-out request requesting to write data of the target application from a memory of the host to the storage device, or a swap-in request requesting to write data in the storage device to the memory; and
calling, based on the swap request, the user interface to perform an operation on the storage device,
wherein when the swap request is the swap-out request, the calling, based on the swap request, the user interface to perform the operation on the storage device comprises:
determining, in response to the swap-out request, first data of the target application in the memory;
removing, in a pre-stored page table, a mapping relationship between a first virtual address and a first physical address, wherein the first virtual address is a virtual address of the first data in a virtual memory, and the first physical address is an address of the first data in the memory;
allocating a second virtual address to the first data, and establishing a second mapping relationship between the second virtual address and the first physical address;
calling the user interface to write the first data indicated by the first physical address corresponding to the second virtual address from the memory to the storage device; and
establishing, in the pre-stored page table, a third mapping relationship between the first virtual address and a first swap entry, wherein the first swap entry indicates a location of the first data in the storage device.

9. The data swapping apparatus according to claim 8, wherein the data swapping method further comprises:
removing the second mapping relationship between the second virtual address and the first physical address, and deleting the first data from the memory.

10. The data swapping apparatus according to claim 8, wherein the data swapping method further comprises:
setting status information of the first virtual address to first information, wherein the first information indicates that a swap type of the first data corresponding to the first virtual address is a user-mode swap type.

11. The data swapping apparatus according to claim 8, wherein when the swap request is the swap-in request, the obtaining a swap request of the target application comprises:

obtaining a virtual address of to-be-accessed second data; and
generating the swap-in request when status information of the virtual address of the second data is fust information, the second data is data of the target application, and the memory does not comprise the second data, wherein the first information indicates that a swap type of the second data is a user-mode swap type.

12. The data swapping apparatus according to claim 11, wherein the calling, based on the swap request, the user interface to perform an operation on the storage device comprises:
in response to the swap-in request, obtaining, based on a pre-stored page table, a second swap entry corresponding to the virtual address of the second data;
calling the user interface to write the second data indicated by the second swap entry from the storage device to the memory; and
establishing a fourth mapping relationship between the virtual address of the second data and a physical address of the second data in the pre-stored page table, wherein the physical address of the second data is an address of the second data in the memory.

13. The data swapping apparatus according to claim 11, wherein before the obtaining a swap request of the target application, the data swapping method further comprises:
after the target application is started, establishing a swap-out thread and a swap-in thread, wherein the swap-out thread is used to perform a swap-out operation of the fit data, and the swap-in thread is used to perform a swap-in operation of the second data.

14. The data swapping apparatus according to claim 13, wherein the establishing a swap-out thread and a swap-in thread comprises:
when the target application is comprised in a pre-stored trustlist, establishing the swap-out thread and the swap-in thread, wherein the trustlist comprises at least one application that supports memory swapping.

15. A non-transitory, computer-readable storage medium, comprising computer instructions, wherein when the computer instructions are run on a data swapping apparatus in a host, cause the data swapping apparatus to perform a data swapping method, wherein an operating system and a target application are installed on the host, the operating system comprises user space, a user interface of the target application is disposed in the user space, the user interface corresponds to a storage device, and the data swapping method comprises:
obtaining a swap request of the target application, wherein the swap request is a swap-out request requesting to write data of the target application from a memory of the host to the storage device, or a swap-in request requesting to write data in the storage device to the memory; and
calling, based on the swap request, the user interface to perform an operation on the storage device,
wherein when the swap request is the swap-out request, the calling, based on the swap request, the user interface to perform the operation on the storage device comprises:
determining, in response to the swap-out request, first data of the target application in the memory;
removing, in a pre-stored page table, a mapping relationship between a first virtual address and a first physical address, wherein the first virtual address is a virtual address of the first data in a virtual memory, and the first physical address is an address of the first data in the memory;

allocating a second virtual address to the first data, and establishing a second mapping relationship between the second virtual address and the first physical address;

calling the user interface to write the first data indicated by the first physical address corresponding to the second virtual address from the memory to the storage device; and establishing, in the pre-stored page table, a third mapping relationship between the first virtual address and a first swap entry, wherein the first swap entry indicates a location of the first data in the storage device.

16. The non-transitory, computer-readable storage medium according to claim 15, wherein the data swapping method further comprises:

removing the second mapping relationship between the second virtual address and the first physical address, and deleting the first data from the memory.

17. The non-transitory, computer-readable storage medium according to claim 15, wherein the data swapping method further comprises:

setting status information of the first virtual address to first information, wherein the first information indicates that a swap type of the first data corresponding to the first virtual address is a user-mode swap type.

* * * * *